(12) United States Patent
Ganu et al.

(10) Patent No.: US 10,380,236 B1
(45) Date of Patent: Aug. 13, 2019

(54) MACHINE LEARNING SYSTEM FOR ANNOTATING UNSTRUCTURED TEXT

(71) Applicant: Amazon Technologies, Inc., Seattle, WA (US)

(72) Inventors: Hrishikesh Vidyadhar Ganu, Bangalore (IN); Rajeev Ramnarain Rastogi, Bangalore (IN); Subhajit Sanyal, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/712,933

(22) Filed: Sep. 22, 2017

(51) Int. Cl.
*G06F 17/24* (2006.01)
*G06N 3/02* (2006.01)
*G06F 17/27* (2006.01)
*G06F 17/22* (2006.01)

(52) U.S. Cl.
CPC ........ *G06F 17/241* (2013.01); *G06F 17/2217* (2013.01); *G06F 17/277* (2013.01); *G06F 17/2775* (2013.01); *G06F 17/2785* (2013.01); *G06N 3/02* (2013.01)

(58) Field of Classification Search
CPC .. G06F 17/241; G06F 17/2217; G06F 17/277; G06F 17/2775; G06F 17/2785; G06N 3/02
USPC ........... 715/230, 231; 706/15, 26, 27, 28, 30
See application file for complete search history.

(56) References Cited

U.S. PATENT DOCUMENTS

| | | | |
|---|---|---|---|
| 6,278,967 B1 | 8/2001 | Akers et al. | |
| 9,069,737 B1 * | 6/2015 | Kimotho | G06F 11/1484 |
| 9,715,496 B1 * | 7/2017 | Sapoznik | G06F 17/279 |
| 9,792,534 B2 * | 10/2017 | Wang | G06K 9/6269 |
| 9,805,371 B1 * | 10/2017 | Sapoznik | G06Q 30/016 |
| 9,807,037 B1 * | 10/2017 | Sapoznik | H04L 51/02 |
| 9,830,315 B1 * | 11/2017 | Xiao | G06F 17/2785 |
| 9,881,208 B2 * | 1/2018 | Savchenkov | G06T 7/13 |
| 9,984,062 B1 * | 5/2018 | Strope | G06F 17/2775 |

(Continued)

OTHER PUBLICATIONS

Vladislav Zorov; How do I determine if a string is upper or lower-case in Python 3.4?; Mar. 25, 2015; Quora.com; pp. 1-5.*
Wu et al.; Google's Neural Machine Translation System: Bridging the Gap between Human and Machine Translation; Sep. 26, 2016; pp. 1-23.*
Bahdanau, et al., "Neural Machine Translation by Jointly Learning to Align and Translate," Published as a conference paper at ICLR 2015, pp. 1-15.

(Continued)

*Primary Examiner* — Andrew R Dyer
(74) *Attorney, Agent, or Firm* — Robert C. Kowert; Meyertons, Hood, Kivlin, Kowert & Goetzel, P.C.

(57) ABSTRACT

Systems and methods are disclosed to implement a machine learning system that is trained to assign annotations to text fragments in an unstructured sequence of text. The system employs a neural model that includes an encoder recurrent neural network (RNN) and a decoder RNN. The input text sequence is encoded by the encoder RNN into successive encoder hidden states. The encoder hidden states are then decoded by the decoder RNN to produce a sequence of annotations for text fragments within the text sequence. In embodiments, the system employs a fixed-attention window during the decoding phase to focus on a subset of encoder hidden states to generate the annotations. In embodiments, the system employs a beam search technique to track a set of candidate annotation sequences before the annotations are outputted. By using a decoder RNN, the neural model is better equipped to capture long-range annotation dependencies in the text sequence.

20 Claims, 9 Drawing Sheets

(56) References Cited

U.S. PATENT DOCUMENTS

| | | | | |
|---|---|---|---|---|
| 2001/0041978 | A1* | 11/2001 | Crespo | G10L 15/1815 704/257 |
| 2009/0157571 | A1* | 6/2009 | Smith | G06K 9/6256 706/12 |
| 2015/0066496 | A1* | 3/2015 | Deoras | G10L 15/16 704/232 |
| 2016/0352656 | A1* | 12/2016 | Galley | H04L 51/02 |
| 2017/0192956 | A1* | 7/2017 | Kaiser | G06F 17/271 |
| 2017/0286972 | A1* | 10/2017 | Hausler | G06Q 30/016 |
| 2017/0293836 | A1* | 10/2017 | Li | G06N 3/0445 |
| 2017/0323203 | A1* | 11/2017 | Matusov | G06F 15/18 |
| 2017/0323636 | A1* | 11/2017 | Xiao | G10L 15/16 |
| 2018/0005082 | A1* | 1/2018 | Bluche | G06K 9/6256 |
| 2018/0012231 | A1* | 1/2018 | Sapoznik | G06Q 30/016 |
| 2018/0060727 | A1* | 3/2018 | Rainwater | G06N 3/04 |
| 2018/0114108 | A1* | 4/2018 | Lao | G06N 3/006 |

OTHER PUBLICATIONS

Zhiheng Huang, et al., "Bidirectional LSTM-CRF Models for Sequence Tagging," modarXiv:1508.01991v1 [cs.CL] Aug. 9, 2015, pp. 1-10.

Minh-Thang Luong, et al, "Effective Approaches to Attention-based Neural Machine Translation," available at http://nlp.stanford.edu/projects/nmt, arXiv:1508.04025v5 [cs.CL] Sep. 20, 2015, pp. 1-11.

Guillaume Lample, et al., "Neural Architectures for Named Entity Recognition," The code of the LSTM-CRF and Stack-LSTM NER systems are available at https://github.com/glample/tagger and https://github.com/clab/stack-lstm-ner,arXiv:1603.01360v3 [cs.CL] Apr. 7, 2016, pp. 1-11.

John Lafferty, et al., "Conditional Random Fields: Probabilistic Models for Segmenting and Labeling Sequence Data," Penn Libraries; University of Pennsylvania ScholarlyCommons, Department of Computer & Information Science, Jun. 28, 2001, pp. 1-10.

* cited by examiner

MACHINE LEARNING SYSTEM FOR ANNOTATING UNSTRUCTURED TEXT

BACKGROUND

Companies are increasingly storing large volumes of unstructured natural language data. For example, an e-commerce company may maintain large electronic catalogues of items, and a wealth of unstructured data associated these items in the form of user reviews, product descriptions, etc. As another example, websites may maintain personal profiles of its users, which may include natural language data about the user.

In many cases, it may be desirable to programmatically perform semantic analysis or extract structured information from such unstructured data. For example, it may be desirable to machine analyze an item's description to determine the item's features. However, current methods and models to perform such analysis are not well adapted to capture long-range annotation dependencies in the text. Thus, current text analysis techniques do not work well when they are applied to infer attributes or structure from lengthy text. Relatedly, many current machine learning models for text analysis are too complex for their given task, a condition which results in an overfitting of the model to the training data set. The problem of overfitting is a poorly understood mechanism, and the task of tuning a model to the appropriate level of complexity to avoid overfitting remains a practical challenge. Better models for extracting structure from long text and better ways of tuning such models are generally needed.

Figure 1:
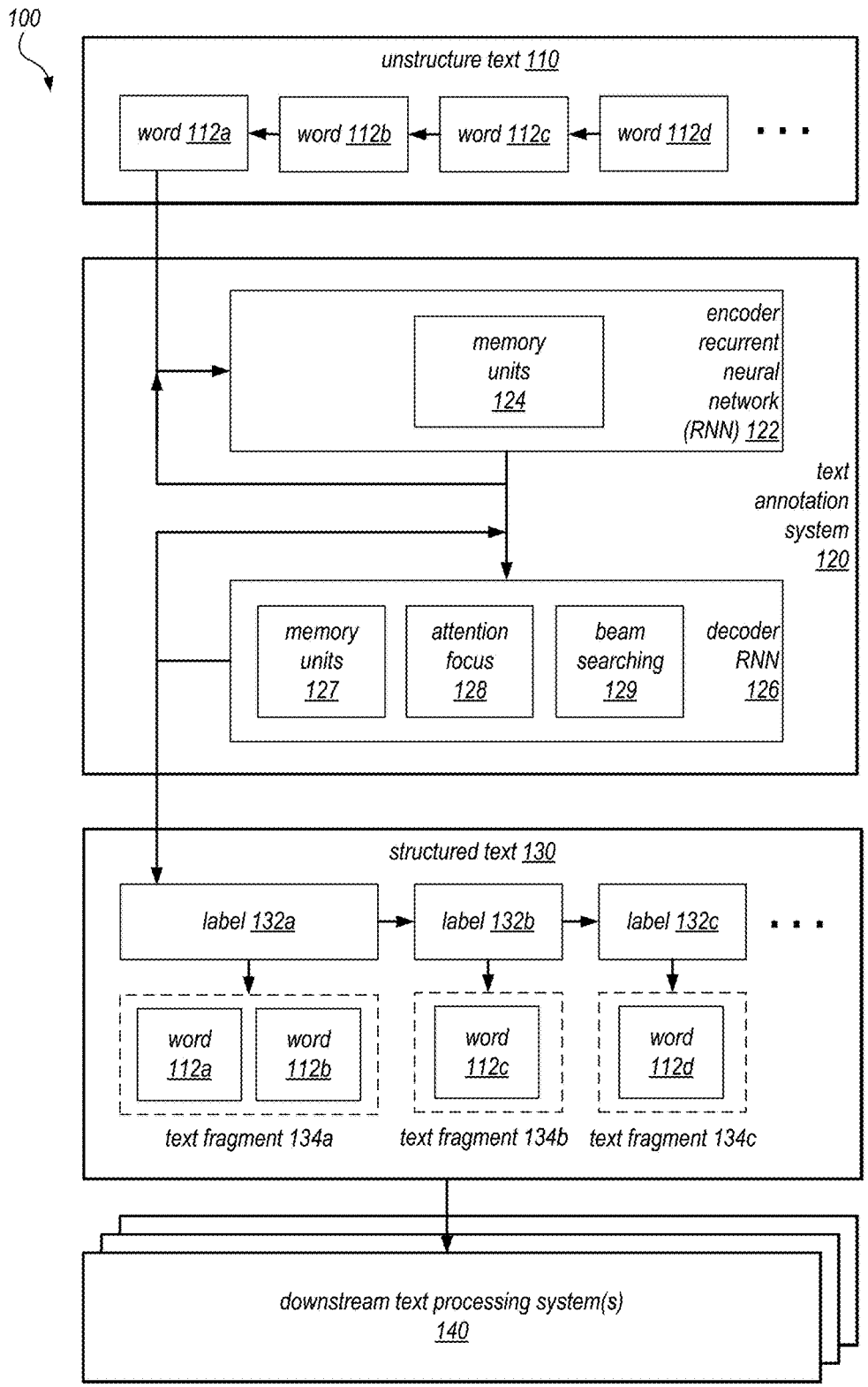
FIG. 1 is a block diagram illustrating an example text annotation system that annotates text using encoder and decoder recurrent neural networks, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in embodiments to implement a text annotation system that annotates long text sequences with labels. In embodiments, the text annotation system uses a machine learning model (e.g., a neural network model), that includes an encoder recurrent neural network (RNN) and a decoder recurrent neural network. In some embodiments, an input text comprising a sequence of words is encoded by the encoder RNN into a series of successive encoder hidden states, where each hidden state is produced based on a word in the text sequence and a previous encoder hidden state. The encoder hidden states are then decoded by the decoder RNN to produce a sequence of annotations for text fragments in the text sequence. In the decoder RNN, each annotation may be generated from a corresponding decoder hidden state in a series of successive decoder hidden states, where each hidden state is produced based on a previous decoder hidden state and the output of the previous decoder hidden state. In some embodiments, the system may employ a fixed-attention window during the decoding phase to focus on a subset of encoder hidden states to generate each annotation. In embodiments, the system may employ a beam search technique to track a set of candidate annotation sequences before the annotations are outputted. By using a decoder RNN, the neural network model is better equipped to capture long-range annotation dependencies in the text sequence.

In some embodiments, the text annotation system may be used to generate a sequence of text fragment labels for a portion of a text describing a particular item, for example a customer review of the particular item on an e-commerce website. In this context, the text annotation system may be trained to make sense of the item description by extracting key attributes (e.g., item type, model name, etc.) from the description. The text annotation system may tag tokens (e.g., words, phrases, or sentences) in the description with a tag, label, or annotation based on an attribute type that the token belongs to. The attribute type may be selected from a predetermined set of tags, labels, or annotations, which may indicate a semantic meaning of the token. For example, an annotation COLOR may indicate that a particular word in a sentence relates to the color of the item, while a second annotation WEIGHT may indicate that another word relates to the weight of the item. In this manner, the text annotation system may assign tags, labels, or annotations to multiple tokens in the item description (possibly all tokens), thereby inferring some semantic structure from the unstructured description.

In some embodiments, such a text annotation system may be used to implement an end-to-end scalable framework to provide a good baseline model for structuring item descriptions, without relying on hand-engineered features. This is important given the difficulty of creating hand-engineered features for a business listing a large number of items and maintaining a large number of item descriptions, such as customer reviews. In this setting, a robust model for item descriptions may be trained using a relatively small group of compute nodes, and in parallel fashion. In some embodiments, the training may be performed using graphics processing units (GPUs), which may be more efficient than general-purposes CPUs due to their highly parallel architecture. By using a cluster of training nodes, the system may be scaled out horizontally to build models at scale, as the number of items and text descriptions increase.

In some embodiments, the text annotation system may allow additional information (e.g., orthographic features) to be generated and used by and during the modeling process, other than just the token-based labels. For example, in some embodiments, a character-level representation may be used as orthographic information as output information from the text-annotation system, which is also used by the text annotation system. Such information related to the internal construction of tokens in the item description may be particularly useful to decipher certain types of information, such as the model names of the items.

In some embodiments, during the training of the machine learned model of the text annotation system, techniques may be employed to adjust the complexity of the model (e.g., the number of parameters in the model) so as to prevent overfitting of the model to the training data. As may be understood, when a model such as deep neural network or RNN are overly complex, the model may simply develop memory elements to memorize the training data. Such an adaptation by the model to the training data is not useful and will even reduce the model's accuracy with respect to real-world data. In some cases, no "validation" data sets are available to prevent the overfitting. Accordingly, to avoid overfitting to the training data, in some embodiments, the annotation model is first trained using the training data, and then using a synthetic data set that reflects random truth labels. The complexity of the model may then be iteratively reduced, for example, by tuning a complexity parameter, until the model's performance no longer improves against the synthetic data set. The resulting complexity level may indicate a good point where the model is no longer simply memorizing the synthetic data. Accordingly, a simpler annotation model is produced, which is not overfitted to the training data. These and other benefits and features of the inventive text annotation system and described in further detail below, in connection with the figures.

FIG. 1 is a block diagram illustrating an example text annotation system that annotates text using encoder and decoder recurrent neural networks, according to some embodiments. As shown, the system 100 includes a text annotation system 120, which takes as input an unstructured text 110, and produces as output structured text 130.

As shown, the unstructured text 110 is provided as input data to the text annotation system 120. The unstructured text 110 may include a sequence of words 112*a-d* in a particular sequence order, which may be words in any language. The text annotation system 120 may initially tokenize the words 112 in the unstructured text 110 into individual tokens, which are then used to generate the hidden states in a neural network model used by the text annotation system 120. In different embodiments, different types of tokens may be used. For example, in some embodiments, individual phrases (e.g. bi-grams), sentence fragments, or sentences may be treated as tokens. In some embodiments, individual characters within each word may be used to generate a character-level representation of the word, which may be treated as a separate token. In some embodiments, the unstructured text 110 may be a variable sequence of natural language that contains multiple sentences or even paragraphs. In some embodiments, the unstructured text may include some degree of formatting or metadata information. The unstructured text 110 is then annotated by the text annotation system 120, to generate structured text 130.

The structured text 130 represents the output data by the text annotation system 120. The structured text 130 may include a sequence of labels (e.g., labels 132*a-c*) that represent annotations assigned to different words or text fragments (e.g., 134*a-c*) in the unstructured text 110. In some embodiments, the output of the text annotation system 120 may include just the labels 132. In some embodiments, the text annotation system 120 may generate a new representation of the structured text 100 to include the labels 132 as additional metadata. In some embodiments, the labels 132 may have a one-to-one relationship with each token of the input text 110. In some embodiments, the labels 132 may be assigned to a continuous group of multiple tokens in the input text, which may form a text fragment 134. In some embodiments, the text annotation system 120 may generate one label 132 for each token (e.g. a word 112), and then collect all adjacent words having the same resulting label, as a separate step, to form a resulting text fragment 134 having the common label.

The labels 132 may be selected from a library of preselected labels, which may be selected to indicate certain semantic information from the input text 110. For example, the input text 110 may represent a description of an item, and the labels 132 may include different types of item features that may be described in the input text (e.g., item size, item color, etc.). The text annotation system 120 may include a machine trained or machine learning model that was trained using the set of labels. Such labeling in the output structured text 130 is useful to facilitate further downstream analysis and/or processing of the input text 110, and may be used to drive programmatic actions based on the input text. For example, using the text labels for an item description, a downstream system 140 may extract information such as the size of the item, and then programmatically update the item's size metadata, so that the item can be properly queried and grouped, based on its determined size. Thus, in some embodiments, the text annotation system 120 may represent a preprocessing step to a number of downstream text processing systems or applications 140.

The text annotation system 120 is a computer system, which may include one or more processing units. In some embodiments, the text annotation system 120 may be implemented using a single server, which may include one or more processors or processor cores. In some embodiments, the text annotation system 120 may be implemented such that it can be used to annotate many pieces of input text 110 in parallel in a scalable fashion. For example, in some embodiments, the text annotation system 120 may be executed in parallel fashion, as separate processes or threads on a single computer. In some embodiments, the text annotation system 120 may be implemented using a group of compute nodes, each having its own CPU, which may be configured to perform annotations of different input texts 110 independently. In some embodiments, the compute nodes that are used to implement the text annotation system 120 may be implemented as instances of virtual machines that are hosted on physical servers, and such virtual machine instances may be provisioned dynamically, to suit the runtime needs of the system.

In some embodiments, the text annotation system 120 may be implemented as a subsystem, module, or service, within a larger system. In some embodiments, the output 130 of the text annotation system 120 may be fed into one more downstream text processing systems 140. The labels or annotations 132 generated by the text annotation system 120 may be used to facilitate the downstream processing of text performed by the larger system that incorporates the text annotation system 120 or the downstream systems 140.

In some embodiments, the larger or downstream system 140 may be, for example, an e-commerce system that receives and processes different types of textual input from users, such as item descriptions, user reviews, user complaints, etc. These different types of textual input may be annotated by the text annotation system 120, and then used to perform a variety of additional programmatic tasks. In some embodiments, the downstream tasks may be performed by machine learning systems with models that depend on the annotations generated by the text annotation system 120. For example, in some embodiments, the downstream system 140 may comprise an autocategorization application that automatically assigns an item to one or more item categories, based on its textual description, which may be provided by an item's owner that is listing the item on the e-commerce system. In some embodiments, the downstream system 140 may comprise an item title or summary generation application, which may be configured to generate a consistent looking title and/or summary from different item descriptions. In some embodiments, the downstream system 140 may comprise a title verification application that performs various checks on an item's information, based on the textual data provided for the item. For example, the verification application may check whether an item's supplied title or selected categories are appropriate, given the item's supplied description. If not, the system may perform an auto-generation of the item's title, using the title generation application.

Another example of a larger system or downstream system that may use a text annotation system 120 may be a system that maintains user profiles having textual description of the users. These descriptions of users may be annotated and then analyzed to allow downstream analysis and/or classification of the users. As yet another example, the text annotation system 120 may be included as part of a support system that receives and handles user service requests, or answer user questions. Textual input from the users indicating their requests or questions may be passed through an embodiment of the text annotation system 120 to create a structured version of the text, so that the text may be further analyzed by downstream systems to, for example, programmatically handle the request or assign the request to one or more other systems. A person of ordinary skill in the art would understand that these discussions of downstream systems 140 are merely illustrative. Other types of downstream text processing systems 140 may also be implemented using the text annotation system 120 and are contemplated within the scope of this disclosure.

In some embodiments, the text annotation system 120 may be implemented as part of a machine learning service (MLS) designed to support large numbers of users and a wide variety of machine learning algorithms to solve problems. In some embodiments, the MLS may include a number of programmatic interfaces, such as application programming interfaces (APIs) defined by the service, which guide non-expert users to build and use machine learning models using machine learning best practices relatively quickly, without the users having to expend a lot of time and effort on tuning models, or on learning advanced statistics or artificial intelligence techniques. The interfaces may, for example, allow non-experts to rely on default settings or parameters for various aspects of the procedures used for building, training and using machine learning models, where the defaults are derived from the accumulated experience of other practitioners addressing similar types of machine learning problems. At the same time, expert users may customize the parameters or settings they wish to use for various types of machine learning tasks, such as input record handling, feature processing, model building, execution and evaluation. In at least some embodiments, in addition to or instead of using pre-defined libraries implementing various types of machine learning tasks, MLS clients may be able to extend the built-in capabilities of the service, e.g., by registering their own customized functions with the service. Depending on the business needs or goals of the clients that implement such customized modules or functions, the modules may in some cases be shared with other users of the service, while in other cases the use of the customized modules may be restricted to their implementers/owners.

In some embodiments, a machine learning toolkit may be provided to users to allow the users to build machine learning models or perform tasks of a given machine learning workflow. As with the MLS service, the toolkit may be used to program machine learning systems to perform tasks such as extracting records from data sources, generating statistics on the records, feature processing, model training, prediction, etc. An embodiment of the text annotation system 120, for example, may be made available as a library in the toolkit, as one option to allow users to generate labels from text sequences. The users may then develop more complex or application-specific machine learning systems, using the text annotation system.

In some embodiments, the text annotation system 120 may be used to generate a library of pre-trained models, to be used with downstream text processing or machine learning systems. For example, in some embodiments, the text annotation system 120 may be used to generate labels or annotations for different groups of items or different types of item descriptions that are contained in an item catalogue. In some embodiments, the text annotation system 120 may be used to extract different sets of labels or annotations from the same texts. The different types of labels or annotations may be associated with different semantic content in the texts, and these annotations may be used for different downstream applications.

As shown, in some embodiments, the text annotation system 120 may include one or more neural network models. The neural network model may include two separate recurrent neural networks (RNNs), an encoder RNN 122, and a decoder RNN 126. In some embodiments, the connections in a RNN between units form a directed cycle, which allows the neural network to exhibit dynamic temporal behavior. In some embodiments, the units of the RNN may include memory units, such as memory units 124 and 127, as shown. The RNN may ingest incoming data progressively, and the memory units may be updated with the progressive incoming data, updating a "hidden state" of the RNN. Thus, as incoming data is consumed by the RNN, the RNN's state is updated from one hidden state to the next, as supported by memory units such as units 124 and 127.

In some embodiments, the memory units 124 and/or 127 may be implemented using long short-term memory (LSTM) units. LSTM units may be used in RNN networks to remember values over arbitrary intervals. An LSTM may be used to classify, process, and predict time series given time lags of unknown size and duration between important events. Relative insensitivity to gap length gives an advantage to LSTM over alternative memory models and other sequence learning methods in numerous applications.

In some embodiments, the encoder RNN may consume each token (e.g., a word 112) in the input text 110 successively. In some embodiments, the encoder RNN may generate an encoder hidden state based on each token. The encoder hidden states may then transition from one state to the next, where each hidden state is based on a next input token from the input text 100, and the previous encoder state.

In some embodiments, the encoder hidden states generated by the encoder RNN 122 are then provided to the decoder RNN 126, which will then generate a series of decoder hidden states. In some embodiments, each decoder hidden states will correspond to the output of a label 132 or annotation, which may be associated with a token in the input text 110. In some embodiments, each successive decode hidden state may depend on a previous decoder hidden state, and also the label or annotation outputted from the previous decoder hidden state. In some embodiments, the decoder states may follow immediately from the encoder hidden states, so that as soon as the last token in the input text is consumed, the text annotation system 120 begins to output successive labels 132. Those skilled in the art would understand that the encoder RNN and decoder RNN may be implemented using a variety of different architectures, and all these various architectures may be employed to implement the text annotation system 120 shown in the figure. For example, in some embodiments, the text annotation model may be implemented using multiple layers of neurons, so that the output of one layer is the input of another layer. Such layering of neurons in the neural network allows the network to learn and recognize more abstract from the input text 110.

In addition, by using the decoder RNN 126, the text annotation system 120 is better equipped to capture long-range annotation dependencies in the text sequence 110. In particular, empirical evidence indicates sequence models such as the text annotation system 120 improves the capture of cross-label dependence over long range text over other types of models, such as Conditional random field (CRF) models. Conditional random fields are a class of statistical modeling method often applied in pattern recognition and machine learning and used for sequence prediction. Whereas a discrete classifier predicts a label for a single sample without considering "neighboring" samples, a CRF can take context into account by using a linear chain CRF on top of an RNN to predict sequences of labels for sequences of input samples. However, CRF-based models do not perform well to determine long-range dependencies among the labels to be captured. In particular, in CRF models, a label at position t', $y_{t'}$ is conditionally independent of another label $y_t$, given an intermediate level $y_{t''}$ such that t<t''<t'. Thus, the only way for information to propagate across any two labels is through all intermediate labels in the sequence. However, in a text annotation model that uses both an encoder RNN and decoder RNN as shown in the figure, the output $y_t$ from the $t^{th}$ time step is passed back into the RNN network. This passing of output back into the RNN is intuitively equivalent to a graphical model where each $y_t$ influences all $y_{t'}$ where that t<t'. Accordingly, information may flow more easily from one label to any subsequent label directly through the decoder RNN (skipping any intermediate labels). This capability of the decoder RNN leads to a fully connected directed graph, and effectively allows the model to capture long-range dependencies across labels.

As shown, in some embodiments, the decoder RNN 126 may include an attention focus unit 128. An attentional mechanism may be used in sequence models improve sequence models to selectively focus on parts of the input text during the annotation process. That is, in some embodiments, a set of input text positions are consulted throughout the entire course of the decoding process. In some embodiment, at each time step t in the decoding phase, a context vector $c_t$ may be generated that captures relevant source-side information to help predict the output label $y_t$. Then, given the decoder hidden state $h_t$ and the context vector $c_t$, a concatenation layer may be employed to combine the information from $h_t$ and $c_t$ to produce an attentional vector, which is used to selectively focus on certain positions in the input text position. In a global attention mechanism, the decoding process attends to all tokens in the input text for each output label. This approach is computationally expensive and can potentially render it impractical to translate longer sequences. Thus, in some embodiments, a local attention mechanism may be used, to focus only on a small subset of the source tokens in the input text.

In some embodiments, a fixed attention mechanism may be used in the text annotation system 120. In some cases, the annotations or labels 132 may have a one-to-one relationship or alignment with the tokens 112 in the input text 110. Thus, the attention mechanism may be configured to focus its attention based on this known alignment, to focus on tokens in the neighborhood of a label's corresponding (aligned) token. In some embodiments, the encoder hidden states in a fixed window of states in the neighborhood of the corresponding token is used to generate the context vector.

As shown, in some embodiments, the decoder RNN 126 may include a beam searching unit 129. A beam search unit may be used to implement a search algorithm that explores a graph by expanding the most promising node in a limited set. In the context of the text annotation system 120, generating predictions from the text annotation model is expensive in terms of memory usage and computation, because the solution space is exponential in terms of the input text length. Thus, in some embodiments, a beam search unit 129 is used to limit the search field to only a predetermined number of best partial solutions, as candidates to be explored. The beam search unit 129 may maintain the top k partial hypotheses (e.g., sequences of labels)

at all steps during the decoding process. In some embodiments, the beam search unit 129 may use breadth-first search to build its search tree, where each node in the tree is a successive label to be outputted. At each level of the tree, the beam search unit may generate all successor labels of labels at the current level, sorting them in increasing order of heuristic cost (e.g., probability of the label sequence). The beam search unit 129 may only store a predetermined number of best labels at each level, and only those labels are expanded next. In this fashion, the beam width bounds the memory required to perform the search.

Figure 2:
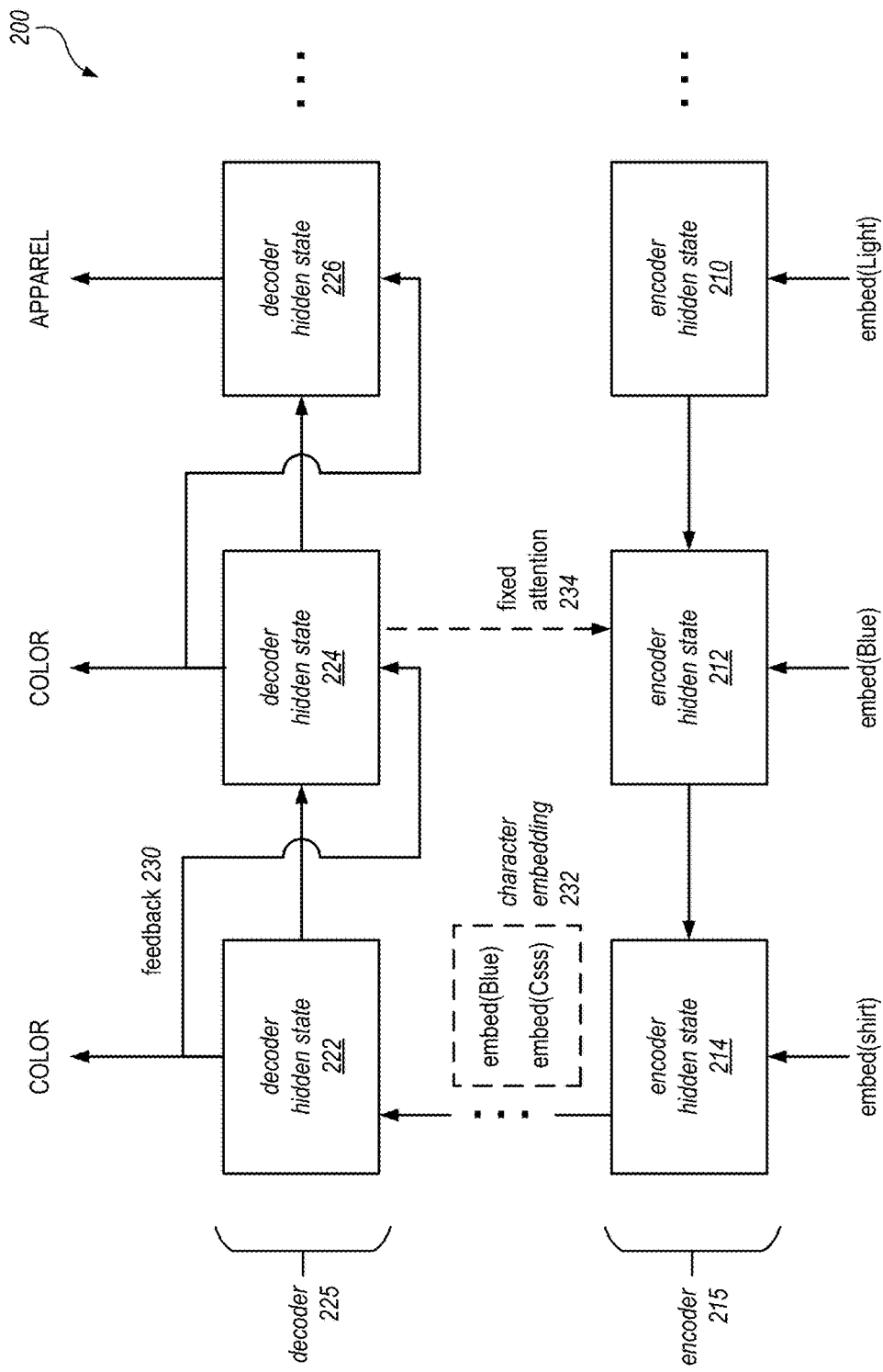
FIG. 2 illustrates a series of example hidden states generated by a text annotation system that annotates text using encoder and decoder recurrent neural networks, according to some embodiments.

FIG. 2 illustrates a series of example hidden states generated by a text annotation system that annotates text using encoder and decoder recurrent neural networks, according to some embodiments. The hidden states 200 shown in the figure may be generated by for example the text annotation system 120 of FIG. 1.

As shown, the text annotation system may first generate a series of encoder hidden states, which transitions from states 210, to 212, to 214. These states may be generated by an encoder 215, which may be for example the encoder RNN 122, as discussed in connection with FIG. 1. At each time step, a new encoder hidden state is generated based on a previous encoder hidden states and a new input token (e.g., words such as "Light," "Blue," and "shirt"). Each encoder hidden states may encode parameters (e.g., using memory units) that capture the semantic meaning of the input text, seen up to the latest token. In some embodiments, the encoder hidden states may be generated based on an embedding of the input tokens. For example, in some embodiments, a word in a large dictionary may be translated via an embedding layer to encode the word to a dense vector. The model may then make its decisions based on this vector representation of the word.

As shown, in some embodiments, a character-level embedding 232 is also generated for a word token. In some embodiments, such internal structure of words may inform the model to make better decisions, e.g., to detect particular brand names associated with items. Accordingly, in some embodiments, each character in an input word may be mapped to, for example, a digit (0), an uppercase letter (C), a lowercase letter (s), or other symbol (o). For example, using this encoding, the word "Blue" will be encoded as "Csss," and the word "$1.90" will be encoded as "o0o00." This representation may be provided as additional information to the model.

After all tokens have been consumed by the model and all input information is collected in an encoder hidden state (e.g., states 214), the model than transitions to a decoder 255, which generates a series of decoder states 222, 224, and 226 based on the encoder hidden state. The decoder 255 may be, for example, the decoder RNN 126, as discussed in connection with FIG. 1. As shown, each decoder hidden states may generate an output label or annotation, at each successive time step. Thus, the output of the model is a sequence output of labels. Each decoder hidden state may be generated based or a previous hidden state (e.g., decoder hidden state) and also the output of the previous decoder hidden state, in a feedback path 230. As discussed, because this feedback 230 is provided to the entire decoder RNN, all previously generated output labels or annotations from the model may be used to influence all subsequent output labels or annotations. This characteristic of decoder RNNs allow the text annotation system to better capture long-range label dependencies over long sequences of input text. Such long-range dependencies allow the model to make better decisions for long text. For example, a piece of information captured in an earlier part of a text may be used to disambiguate tokens in a later part of the text.

As shown, the model may also implement a fixed attention mechanism. In this attention mechanism, each output label may be associated or aligned with a particular input token. This assignment may be encoded in the in the hidden states of the neural network using memory units, such that each decoder hidden states (e.g., states 224) will be aligned to an encoder hidden states (e.g., state 212). The output of that decoder hidden state (COLOR) may represent the label for the token (Blue) that generated that encoder hidden state. The fixed attention mechanism may then revisit a fixed window of encoder hidden states in the neighborhood of the aligned encoder state 212, to generate output for the decoder hidden state.

Figure 3:
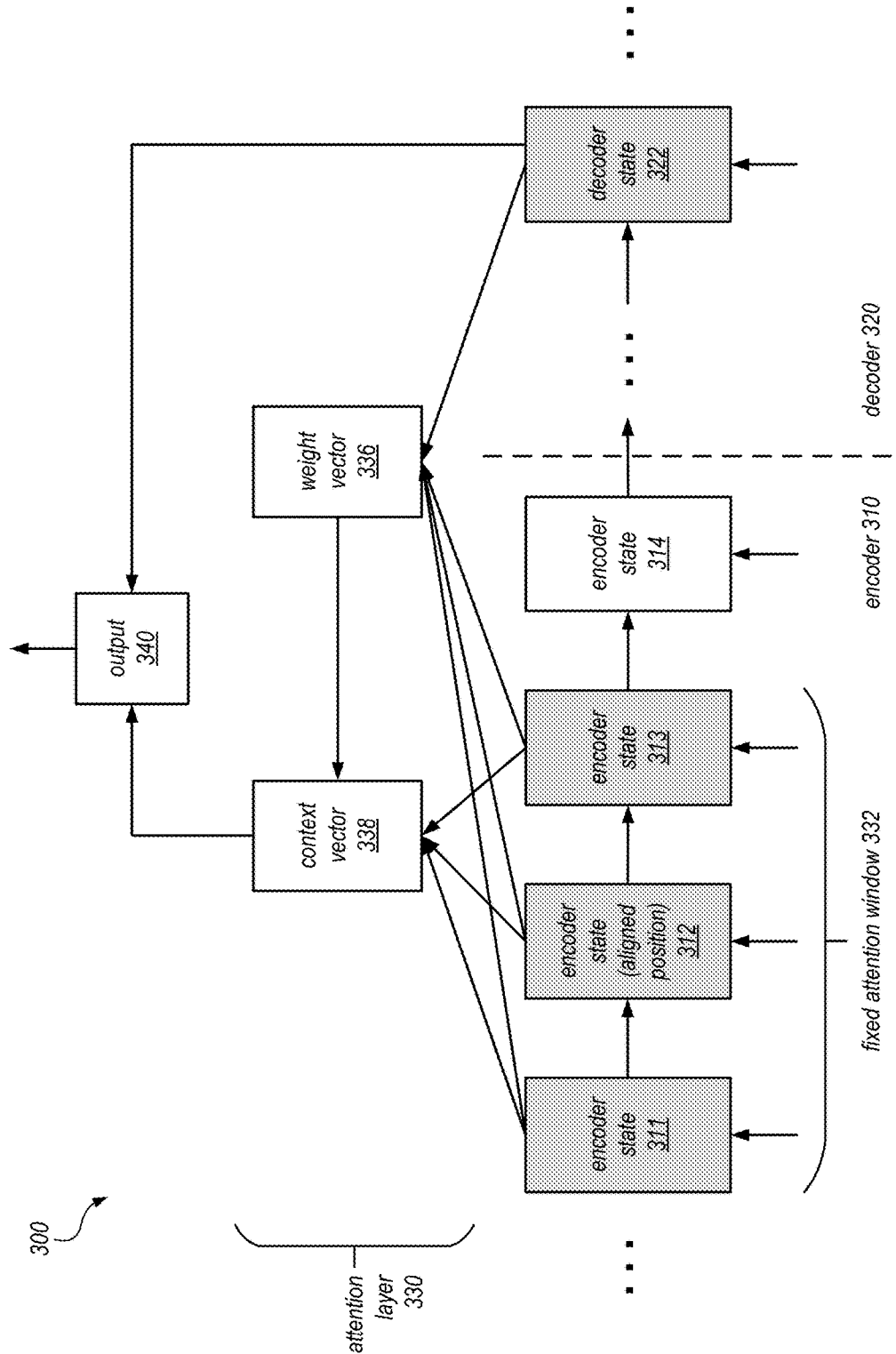
FIG. 3 illustrates a model architecture that implements fixed attention decoding in a text annotation system that annotates text using encoder and decoder recurrent neural networks, according to some embodiments.

FIG. 3 illustrates a model architecture that implements fixed attention decoding in a text annotation system that annotates text using encoder and decoder recurrent neural networks, according to some embodiments. As shown, the figure depicts the operations of an encoder 310, which may be implemented using the encoder RNN 122, and a decoder 320, which may be implemented using the decoder RNN 126, as discussed in connection with FIG. 1. As shown, the encoder 310 may generate a series of encoder hidden states 311, 312, 313, and 314, and the decoder 320 may also generate a series of hidden states, such as decoder state 322.

As discussed, in some embodiments, a set of encoder hidden states may be consulted for each output label or annotation generated at each time step. Accordingly, the model may include an attention layer 330 that allows the model to focus on particular positions of the input text to generate the output label. As shown, the output label is generated by an output unit 340, which in some embodiments may include a softmax layer that selects a label from the predetermine set of labels for each token in the input sequence.

During the decoding process, at each time step t, the model may take as input a decoder hidden state $h_t$ and derive context vector $c_t$ that captures relevant source-side information from the input text to help predict the current output label $y_t$. In some embodiments, a concatenation layer is employed to combine a decoder hidden state $h_t$ and a source-side context vector $c_t$ to produce an attentional hidden state. The attentional hidden state vector is then fed through a softmax layer to produce the predictive distribution of the output labels.

In a global attention model, all hidden states of the encoder are considered when deriving the context vector $c_t$. In this model type, a variable-length alignment weight vector $a_t$, whose size equals the number of time steps on the encoder side, is derived by comparing the current decoder hidden state $h_t$ with each source hidden state $h_s$. Given the alignment vector as weights, the context vector $c_t$ is computed as the weighted average over all the source hidden states.

In a local attention mechanism, a small subset of source positions is chosen for each output label. The local attention mechanism may selectively focus on a small window of context and is differentiable. In some embodiments, the model first generates an aligned position $p_t$ for each output label at time t. The context vector $c_t$ may then be derived as a weighted average over the set of encoder hidden states within the window $[p_t-D, p_t+D]$, where D is an empirically selected window size. Unlike the global approach, the local alignment vector at is fixed-dimensional.

In some embodiments, the text annotation model may implement a fixed attention mechanism. For example, in some cases the alignment of the output labels and the input tokens may be known. Accordingly, the attention window may simply be a fixed attention window 332 of a subset of encoder hidden states (e.g., 311, 312, 313). In the depicted example, the decoder hidden state 322 is aligned with a particular position in the input text that corresponds to the encoder state 312. Accordingly, a fixed-size window of three hidden states surrounding the encoder state 312 is selected to determine the context vector 338. In some embodiments, a weight vector 336 may be used to generate the context vector 338. In other embodiments, no weight vector is used, as the relative selection weights assigned to the encoder states in the fixed attention window are fixed. The context vector 338 and the hidden state 322 may then be combined to produce the output label via the output unit 340.

Figure 4:
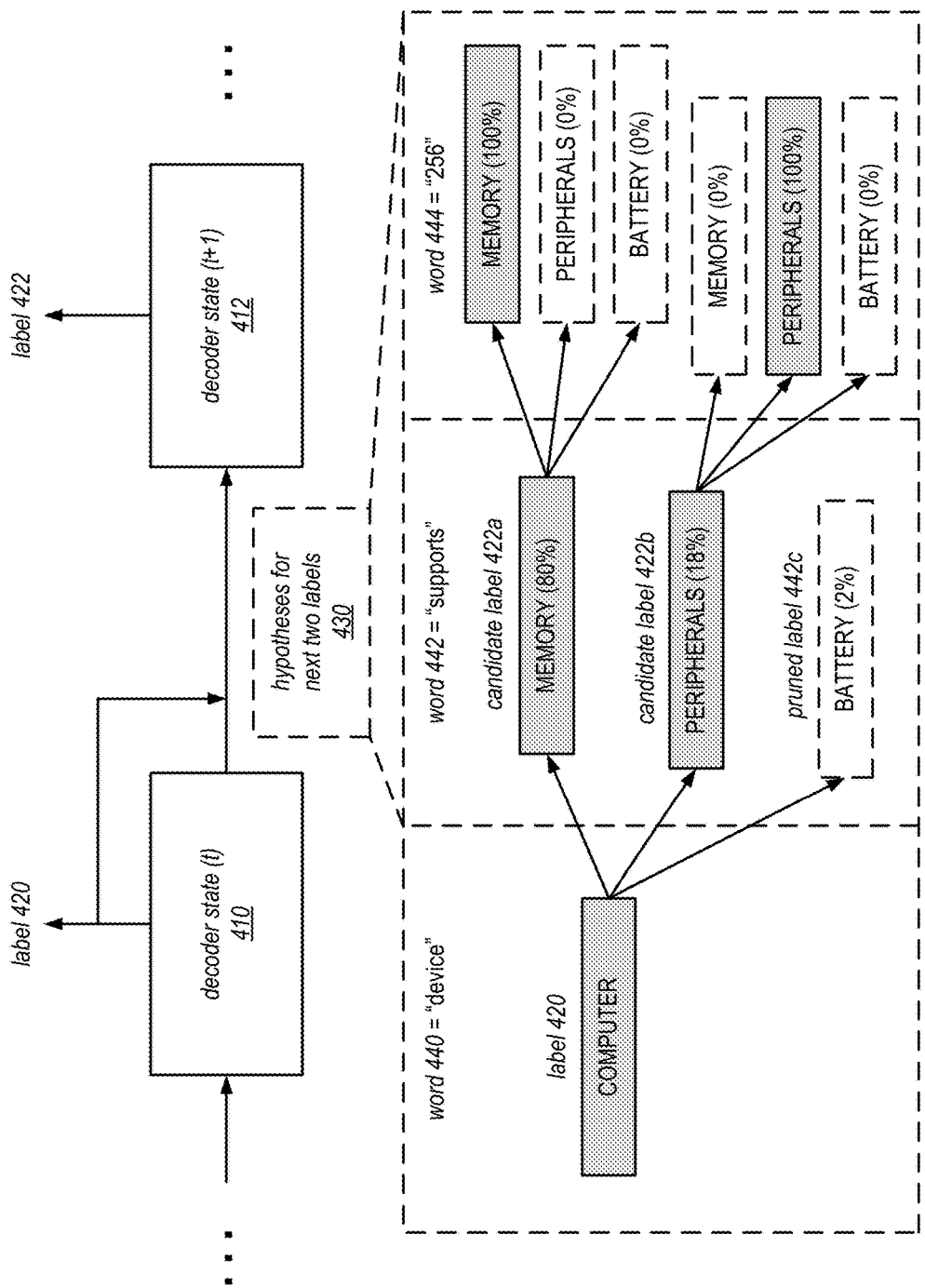
FIG. 4 illustrates an example beam search that is implemented by a text annotation system that annotates text using encoder and decoder recurrent neural networks, according to some embodiments.

FIG. 4 illustrates an example beam search that is implemented by a text annotation system that annotates text using encoder and decoder recurrent neural networks, according to some embodiments. The figure depicts two decoder states, which may be generated by the decoder RNN 126, as discussed in connection with FIG. 1. As shown, decoder state 410 generates a label 420 at time step t, and a decoder state 412 generates a label 422 at time t+1. As shown, decoder state 412 is generated both from the previous state 410, and also the output 420 of the previous state. In the depicted example, the decoder states generate one label per time step but uses a beam search technique to "look ahead" in the sequence of labels to be generated. As shown, beam search has a search depth of two labels, meaning that the model generates hypotheses 430 for possible candidates for the next two labels, to determine the current output label. Thus, to generate label 420 the decoder model generates a tree of possible later labels, as shown in the bottom portion of the figure.

As shown in the bottom portion of the figure, the sequence of input text being decoded comprises of the words 440 ("device"), 442 ("supports"), and 444 ("256"). This sequence of words may be, for example, a snippet of text from an item description for a computer product. At time step t, label 420 (COMPUTER) is generated from decoder state 410. However, at that time, the decoder model has also generated a beam search tree that looks two labels into the future.

For the word 442 ("supports"), the figure shows three possible candidates for the next label, label 442a for MEMORY, label 442b for PERIPHERALS, and label 443c for BATTERY. As shown, a probability of each of the possible labels is determined. The probability may indicate, given the current encoder states and output labels generated so far, the likelihood that the given label is the next label. As shown, the MEMORY label has an 80% probability, the PERIPHERALS label has an 18% probability, and the BATTERY label only has a 2% probability. In some embodiments, when a particular label falls below a likelihood threshold, that label may be pruned from further beam searching, as shown for the BATTERY label. In some embodiments, the pruning may be performed by ranking all of the possible labels at a time step, and removing those candidates that are ranked the lowest. In this manner, the memory usage of the beam search may be bounded.

For the word 444 ("256"), the figure shows possible candidates for the label associated with that token. Again, only a certain set of candidate label sequences are maintained. Thus, as shown, only the MEMORY, MEMORY path and the PERIPHERALS, PERIPHERALS path are maintained in the current beam search tree. All of the other sequences are not likely. They are thus pruned and not explored in later states of the beam search tree.

In this manner, at each time step, the beam search technique outputs a label or annotation for each new hidden state, and at the same time updates in the hidden state a tree of candidate labels the future label sequence. This lookahead mechanism allows the model to make better decisions for each label. Moreover, because the search tree is pruned to limit search breadth and limited in search depth, its memory usage may be limited below a fixed threshold.

Figure 5:
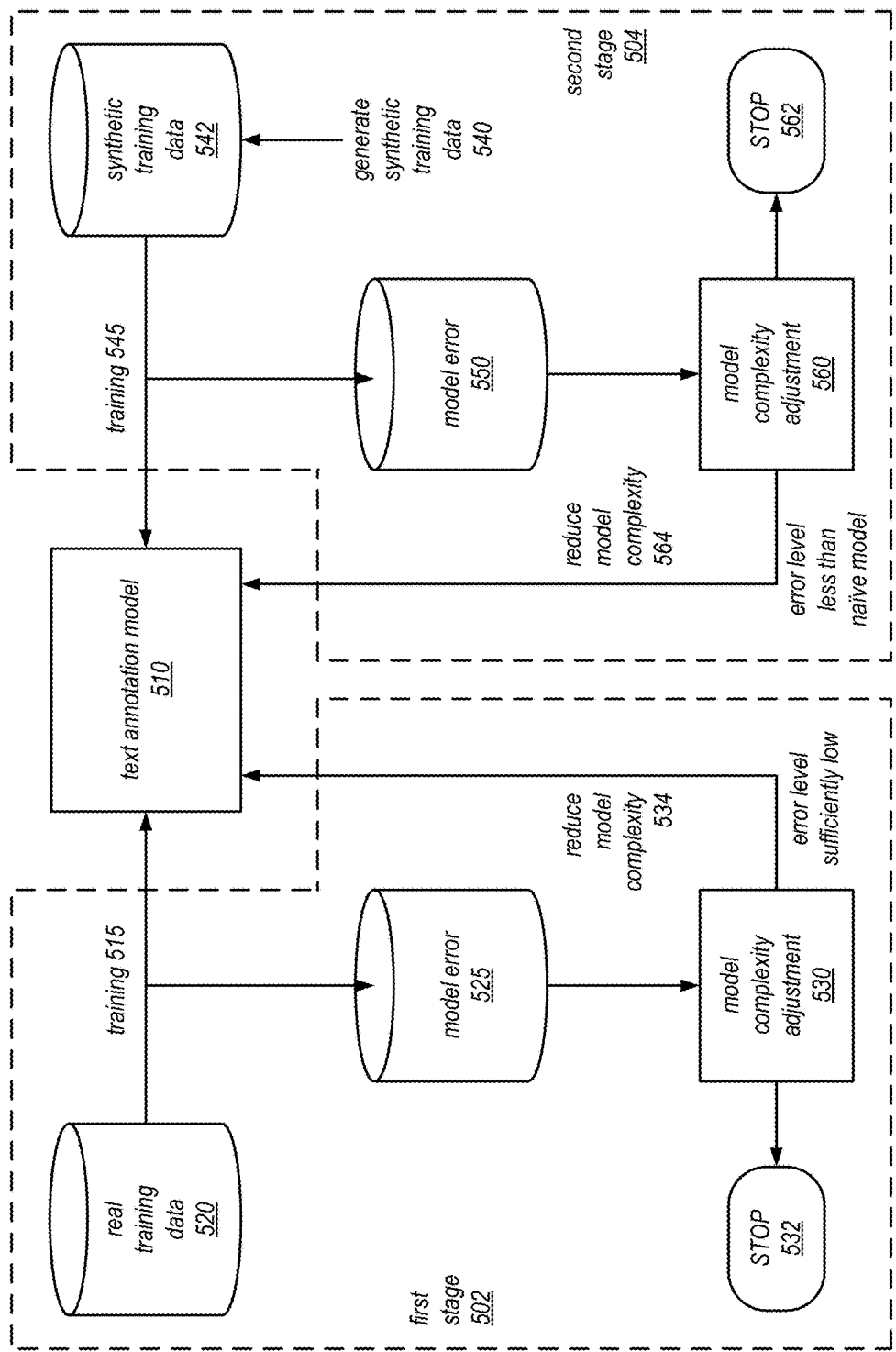
FIG. 5 illustrates a tuning process to tune the complexity of a text annotation model that annotates text using encoder and decoder recurrent neural networks, according to some embodiments.

FIG. 5 illustrates a tuning process to tune the complexity of a text annotation model that annotates text using encoder and decoder recurrent neural networks, according to some embodiments.

In some situations, a deep learning model of high complexity may improve its accuracy on a training data set through two mechanisms. First, the model may improve by learning the task at hand through higher level features, which is what is generally desired. Second, the model may improve by simply memorizing the training data, which does not result in any real "learning." Deep neural networks used in practice can memorize training datasets especially when the number of model parameters is of the same order as the number of data points. In some embodiments of the text annotation system described herein, the annotation model is complex enough to memorize the training data.

In addition, the problem may be aggravated in situations where the training data set is not fully representative of real-world data. For example, to train a text annotation model that is used to extract item attributes from item description data, a set of the most popular items may be selected as the training set (perhaps because truth labels for these products are more readily available). However, it may also be desired to use the resulting model for less popular items. In some situations, a validation data set is not available for this domain of less popular items, because truth labels are not available for these items. Thus, an alternative approach to prevent overfitting of complex model to the training data is needed.

Accordingly, in some embodiments of a complexity tuning method, a synthetic data set of size and input features similar to the real training set is generated. In the synthetic data set, the truth labels are generated uniformly at random. In some embodiments, in a first phase of tuning, the model is trained on the real training data set while lowering the model's complexity. To adjust the model's complexity, a dropout hyperparameter may be changed in each iteration of training. For example, the hyperparameter may control the number of memory units that are zero'ed out in the model, etc. Across each training iteration, the training error of the model is monitored. When the training error increases beyond a specified threshold, the iterative process stops, and the value of the dropout parameter for the previous iteration of the model is used as a tentative dropout value.

Next, in a second phase of tuning, the model configured with the tentative dropout value is iteratively trained on the synthetic data set with random truth labels. Again, the training error of the model is monitored across each iteration. The process progressively reduces the complexity of the model using the dropout parameter, and continues until the model is no longer able to improve against the synthetic data set. Because the synthetic data set contain randomized truth labels, little reasoning may be learned from this data. Thus, any improvement that is seen against the synthetic data may be assumed to be generated from memorization. Accordingly, if the training error indicates that the model is performing better than a naïve model that simply randomly predicts the output label based on label proportions, the process lowers the complexity of the model using the dropout parameter, and performs another tuning iteration. When the training error indicates that the model is performing no better than the naïve model, the process may stop, as the training error indicates that the model is at a complexity level where it is no longer able to memorize the training data.

An embodiment of the tuning process is depicted in FIG. 5. The process includes two stages. In the first stage 502, at operation 515, the text annotation model 510 is trained using real training data 520, to generate a model error 525. The model error 525 is then evaluated using a model complexity adjuster 530, which may determine, based on the model error, whether the model's complexity may be reduced. In some embodiments, if the model's error 525 is remains sufficiently low (e.g., below a threshold), the model's complexity may be reduced at operation 534. The reduction in complexity may be performed using a dropout hyperparameter that controls the number of hidden units that are active in the model 510. In some embodiments, the dropout parameter may indicate a probability that a given hidden unit in the model is randomly zero'ed out, or "dropped out" from the model. The process of the first stage 502 then repeats to iteratively reduce the complexity of the model 510, until the model error 525 is no longer acceptable (e.g., is above a specified threshold). At that point, the process may stop 532. In this manner, the first stage 502 reduces the complexity of the model to a tentative point, where model contains just enough complexity to learn the text annotation task. In some embodiments, the tuning process depicted in the first stage 502 may be piggybacked on the training process of the model 510, and so the process may not necessarily stop at operation 532. Rather, the tuning process may continue to monitor the model error during the training session, and adjust the model's complexity parameter (e.g., dropout parameters) accordingly throughout the training session.

In the second stage, at operation 515, the text annotation model 510 is trained using real training data 520, first, synthetic data set is generated at operation 540. As discussed, the synthetic data set 542 may be generated with random truth labels. The model 510 is then trained using the synthetic data set at operation 545, generating a model error 550. As in the first stage, the model error 550 is evaluated using a model complexity adjuster 560. In some embodiments, the model complexity adjuster 560 may be implemented using the same software or modules as the model complexity adjuster 530 used in the first stage. The model complexity adjuster 560 may be configured to determine, based on the model error 550, whether the model's complexity may be reduced. In some embodiments, if the model's error 525 is lower than the error level of a naïve model that simply randomly predicts the output label based on label proportions, the process may proceed to operation 564 to lower the complexity of the model 510. Again, the complexity of the model 510 may be reduced using the dropout parameter. The process of the second stage then repeats until the model error 550 is no longer lower than the error level of a naïve model, at which point the process stops 562.

In some embodiments, the process in the figure may be performed in a completely automated fashion during the training of the model 510. In some embodiments, the model complexity adjusters 530 and 560 may be implemented as part of a stochastic gradient descent technique during the model training, to adaptive remove excess hidden units from the model 510, based on the dropout parameter. In some embodiments, the process may include one or more manual operations. For example, the lowering of the complexity at operations 534 or 564 may be performed at least partly manually. In some embodiments, the first stage may be performed after the second stage, to ensure that the complexity level determined in the second stage still satisfies the performance requirements (e.g., model error threshold) of the first stage. If not, the complexity level of the model 510 may be increased to satisfy the model error requirements of the first stage. In some embodiments, the process may alternate between the first stage and the second stage until a satisfactory complexity level is found satisfying both stages.

Figure 6:
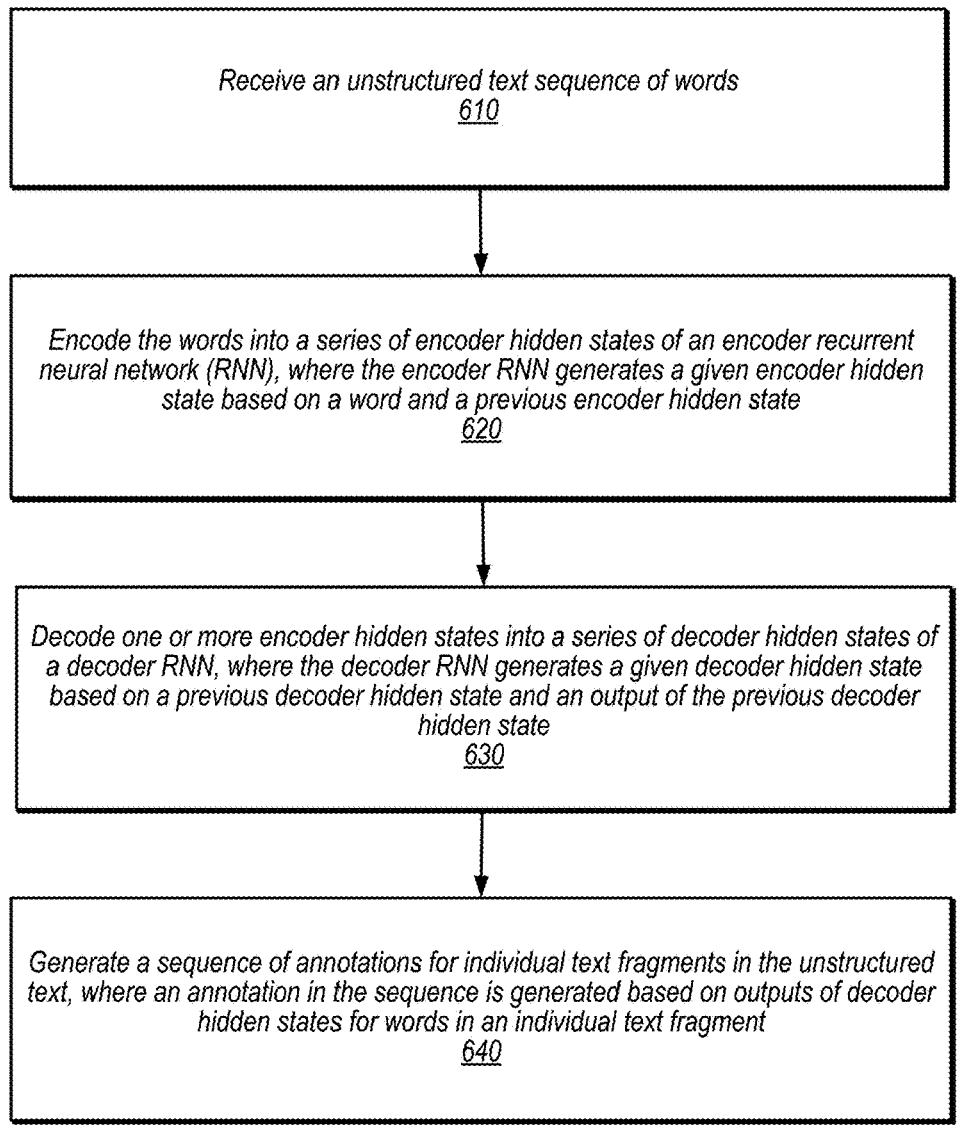
FIG. 6 is a flowchart illustrating an execution of a text annotation system that annotates text using encoder and decoder recurrent neural networks, according to some embodiments.

FIG. 6 is a flowchart illustrating an execution of a text annotation system that annotates text using encoder and decoder recurrent neural networks, according to some embodiments. The process of FIG. 6 may be performed by, for example, the text annotation system 120 discussed in connection with FIG. 1.

At operation 610, a sequence of unstructured text is received. In some embodiments, the unstructured text may include a sequence of words in any language. The text annotation system may tokenize the words in the unstructured text into individual tokens. In different embodiments, different types of tokens other than words may be used. For example, in some embodiments, individual phrases (e.g. bi-grams), sentence fragments, or sentences may be treated as tokens. In some embodiments, individual characters within each word may be used to generate a character-level representation of the word, which may be treated as a separate representation of the token. In some embodiments, the unstructured text may include some degree of formatting or metadata information.

At operation 620, the words in the unstructured text are encoded into a series of encoder hidden states of an encoder RNN. The encoder RNN may be for example encoder RNN 122, as discussed in connection with FIG. 1. The encoder RNN may be configured to generate a given encoder hidden state based on a word in the unstructured text, and a previous encoder state. In some embodiments, the encoder RNN may consume each token in the input text successively, and generate an encoder hidden state based on each token. The encoder hidden states may then transition from one state to the next, where each hidden state is based on a next input token from the input text, and the previous encoder state. In some embodiments, the memory units 124 and/or 127 may be implemented using long short-term memory (LSTM) units, which may be used to remember values over arbitrary intervals in the RNN.

At operation 630, one or more encoder hidden states are decoded into a series of decoder hidden states of a decoder RNN. The decoder RNN may be for example decoder RNN 126, as discussed in connection with FIG. 1. The decoder RNN may be configured to produce an output from a given hidden state corresponding to a word or token in the input unstructured text, and generate the given decoder hidden state based a previous decoder hidden state and an output of the previous decoder hidden state. In some embodiments, the decoder states may follow immediately from the encoder hidden states, so that as soon as the last token in the input text is consumed, the text annotation system begins to output successive labels or annotations. In some embodiments, by using the decoder RNN, the text annotation system is better equipped to capture long-range annotation dependencies in the text sequence.

In some embodiments, the decoder RNN may include an attention focus unit. An attentional mechanism may be used in sequence models to selectively focus on parts of the input text during the annotation process. In some embodiments, the attention focus unit may implement a fixed attention mechanism. In some cases, the annotations or labels outputted by the system may have a one-to-one relationship or alignment with the tokens in the input text. Thus, the attention mechanism may be configured to focus its attention based on this known alignment, to focus on tokens in the neighborhood of a label's corresponding (aligned) token. In some embodiments, the encoder hidden states in a fixed window of states in the neighborhood of the corresponding token is used to generate a context vector that is used to produce the annotation.

In some embodiments, the decoder RNN may include a beam searching unit. The beam search unit may be used to limit the search field to a predetermined number of best partial solutions, as candidates to be explored. The beam search unit may maintain the top k partial hypotheses (e.g., sequences of labels) at all steps during the decoding process. In some embodiments, the beam search unit may use breadth-first search to build its search tree, where each node in the tree is a successive label or annotation to be outputted. At each level of the tree, the beam search unit may generate all successor labels of labels at the current level, sorting them in increasing order of heuristic cost (e.g., probability of the label sequence). The beam search unit may only store a predetermined number of best labels at each level, and expand only those labels at the next level. In some embodiments, the beam search tree may be pruned to remove label or annotation sequences that have a low probability (e.g., below a threshold). In this fashion, the beam width bounds the memory required to perform the search.

At operation 640, a sequence of annotations is generated for individual text fragments in the unstructured text sequence. An annotation in the sequence may be generated based on outputs of decoder hidden states corresponding to words in a respective text fragment. In some embodiments, one annotation may be generated for each word or token in the input unstructured text, and adjacent words or tokens that have the same generated annotation or label a collected to form text fragments having common annotations. In some embodiments, the sequence of annotations may be generated as a part of a structured text, where the annotations are stored as metadata to the original unstructured text.

Figure 7:
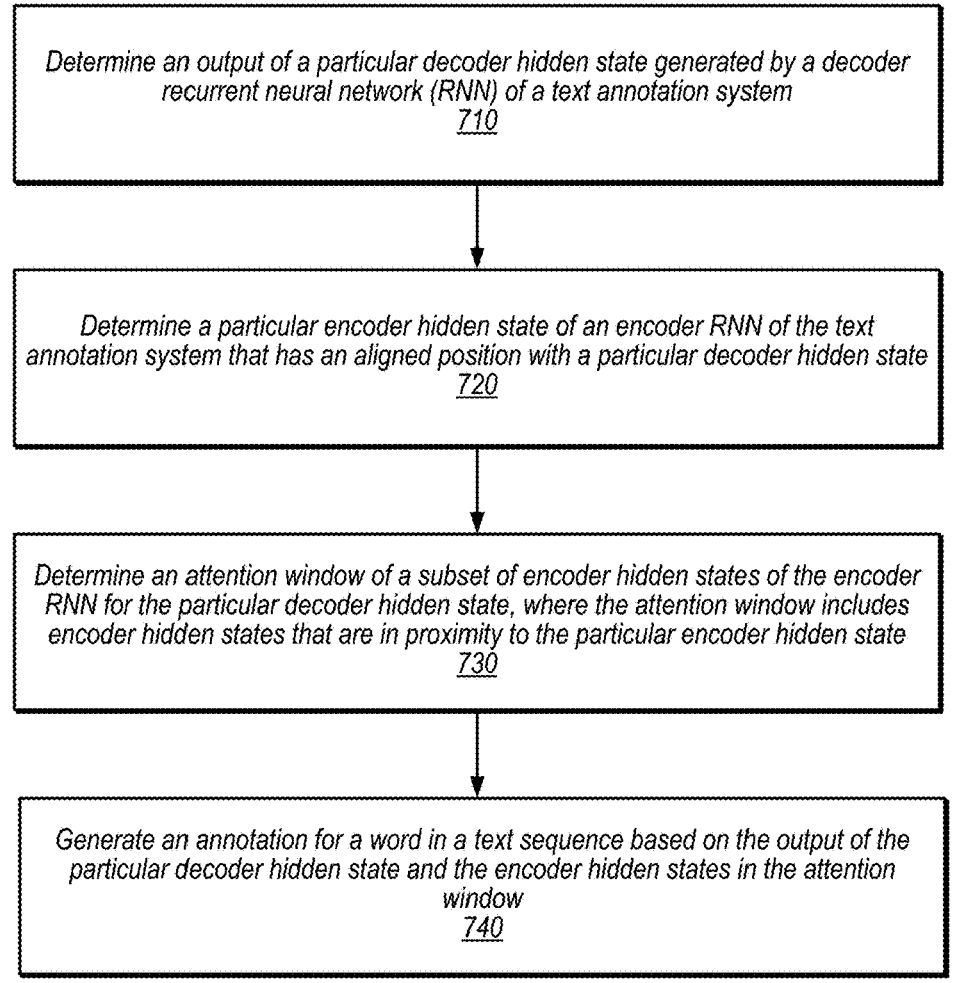
FIG. 7 is a flowchart illustrating a process of attention focusing in a text annotation system that annotates text using encoder and decoder recurrent neural networks, according to some embodiments.

FIG. 7 is a flowchart illustrating a process of attention focusing in a text annotation system that annotates text using encoder and decoder recurrent neural networks, according to some embodiments. The operations of FIG. 7 may be performed by, for example, the attention focus unit 128 or decoder RNN 126, as discussed in connection with FIG. 1.

At operation 710, an output of a particular decode hidden state generated by a decoder recurrent neural network (RNN) is determined. In some embodiments, the decoder RNN may be part of a text annotation system that labels words in a text sequence, such as the text annotation system 120 of FIG. 1. As discussed, the decoder RNN may generate successive decoder hidden states, such that each state produces an output for a respective token in the input text, and each state is generated based on its previous decoder hidden state and the output of the previous decoder hidden state.

At operation 720, a particular encoder hidden state generated by an encoder RNN of the text annotation system is determined. The particular encoder hidden state has an aligned position with a particular decoder hidden state of the decoder RNN. In some cases, the annotations or labels outputted by the decode hidden states may have a one-to-one relationship or alignment with the tokens in the input text. Thus, the attention mechanism may be configured to focus its attention based on this known alignment, to identify the one encoder hidden state and input token that correspond to the particular decoder hidden state.

At operation 730, an attention window of a subset of encoder hidden states of the encoder RNN are determined for the particular decoder hidden state. The attention window may include encoder hidden states that are in proximity to the particular hidden state determined in previous operation. In some embodiments, the attention window may have a fixed size, which may be determined empirically. Thus, for example, to generate the annotation for a single word "shirt" in the input text from a decoder hidden state, the system may first identify the encoder hidden state corresponding to the word, and then focus on an attention window that includes 4 encoder hidden states around the encoder state corresponding to the word "shirt" (e.g., 5 hidden states total, including 2 previous hidden states and 2 later hidden states). This window of encoder hidden states may then be used to generate the annotation for the word "shirt."

At operation 740, an annotation for a word in the text sequence is generated based on the output of the particular decoder hidden state and the encoder hidden states in the attention window. As discussed, the window of encoder hidden states may be used to generate the annotation. In some embodiments, at each time step, the decoder RNN may derive context vector that captures relevant encoder-side information from the input text to help predict the current output label or annotation. In some embodiments, a concatenation layer is employed to combine the decoder hidden state and the context vector to produce an attentional hidden state. The attentional hidden state vector is then fed through a softmax layer of the model to produce the predictive distribution of the output labels or annotations. In some embodiments, the context vector may then be derived as a weighted average over a subset of encoder hidden states within the window $[p_t-D, p_t+D]$, where D reflects an empirically selected window size. The context vector and the particular decoder hidden state are then combined to produce the output label or annotation.

Figure 8:
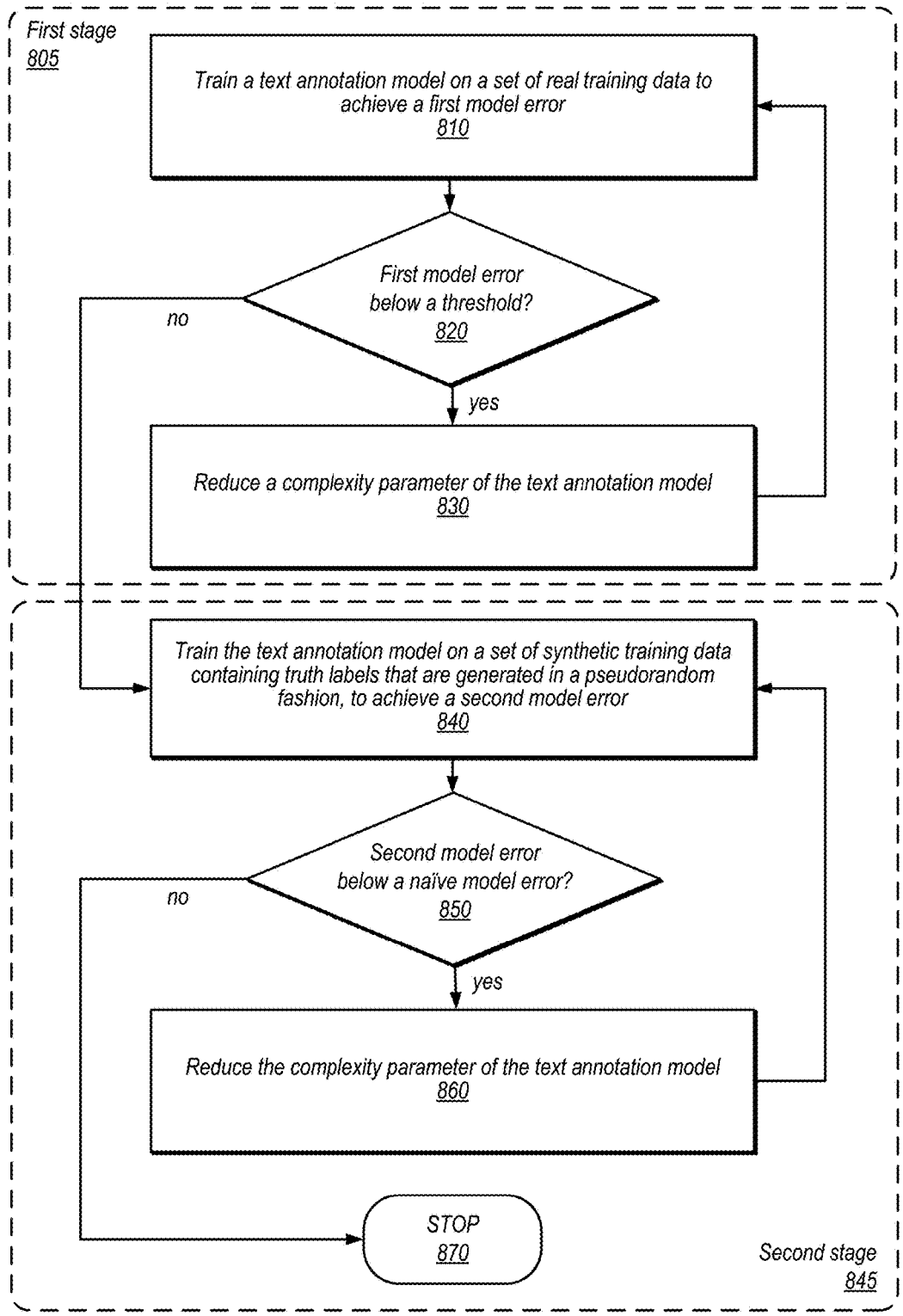
FIG. 8 is a flowchart illustrating a process of tuning the complexity of a text annotation system that annotates text using encoder and decoder recurrent neural networks, according to some embodiments.

FIG. 8 is a flowchart illustrating a process of tuning the complexity of a text annotation system that annotates text using encoder and decoder recurrent neural networks, according to some embodiments. The process of FIG. 8 may be performed as part of a training of a machine learning system, and may be performed in some embodiments in a completely automated fashion. In some embodiments, the process may include one or more manual operations. In some embodiments, the process may be performed via a machine learning service (MLS). The MLS may provide one or more programmatic interfaces to enable client to submit respective requests for related tasks for a given machine learning task or workflow. In some embodiments, a toolkit implementing the depicted process may be provided to program machine learning systems to perform tasks such as extracting records from data sources, generating statistics on the records, feature processing, model training, prediction, etc.

As shown, the process includes two stages. In the first stage 805, the complexity level of a text annotation model is tuned using a set of real training data. At operation 810, the text annotation model is trained on the set of real training data. The real training data may contain data that have verified truth labels (e.g., text fragment labels or annotations), which may have been manually added by users. The training of the text annotation model may be monitored to obtain a first error rate of the model.

At operation 820, a determination is made whether the first model error is below a threshold. Operations 820 may be performed, for example, by a model complexity adjuster 530, as discussed in connection with FIG. 5. In some embodiments, the threshold may be specified by an administrator or user of the model training system. In some embodiments, if the first model error is below the threshold, the tuning process may proceed to operation 830, where the complexity of the model is reduced. On the other hand, if the first model error is not below the threshold, this may indicate that the model now lacks sufficient complexity to learn the task (i.e., annotating the input text sequence). In that case, the process may stop the first stage 805, and proceed to the second stage 845. In some embodiments, the process may revert back to the last version of the model that had sufficient complexity to achieve an error level that was below the threshold, before proceeding to the second stage 845.

If the first model error is below the threshold, the process proceeds to operation 830, where a complexity parameter of the text annotation model is reduced. The operation may be performed by the model complexity adjuster 530 of FIG. 5. In some embodiments, the reduction in model complexity may be performed using a dropout hyperparameter that controls the number of hidden units that are used in the text annotation model. The process of the first stage 805 may then repeat to iteratively reduce the complexity of the model, until the model error level is no longer below the specified threshold.

In the second stage 845 of the tuning process, the complexity level of the text annotation model is further tuned using a synthetic training data set that is generated with random truth labels. At operation 840, the text annotation model is trained on the set of synthetic training data, to generate a second model error. In some embodiments, the synthetic data set is sized and contain input features similar to the real training set.

At operation 850, a determination is made whether the first model error is below an error level of a naïve text annotation model. Operations 820 may be performed, for example, by a model complexity adjuster 560, as discussed in connection with FIG. 5. The naïve training model may simply randomly generate annotations or labels for words in the input text based on the relative proportions of the annotations. Because the synthetic data set contains randomized truth labels, little reasoning may be learned from this data. Thus, any improvement that is seen against the synthetic data may be assumed to be achieved as a result of memorization. Accordingly, if the second training error indicates that the text annotation model is performing better than a naïve model, the process proceeds to operation 860 to lower the complexity of the model using the complexity parameter, and performs another tuning iteration. On the other hand, if the second training error indicates that the model is performing no better than a naïve model, the process may stop at operation 870.

If the second model error is below the error level of the naïve model, the process proceeds to operation 860, where the complexity parameter of the text annotation model is again reduced. The operation may be performed by the model complexity adjuster 560 of FIG. 5. In some embodiments, the reduction in model complexity may be performed using a dropout hyperparameter that controls the number of hidden units that are used in the text annotation model. The process of the second stage 845 may then repeat to iteratively reduce the complexity of the model, until the model error level is no better than the naïve model's error.

Figure 9:
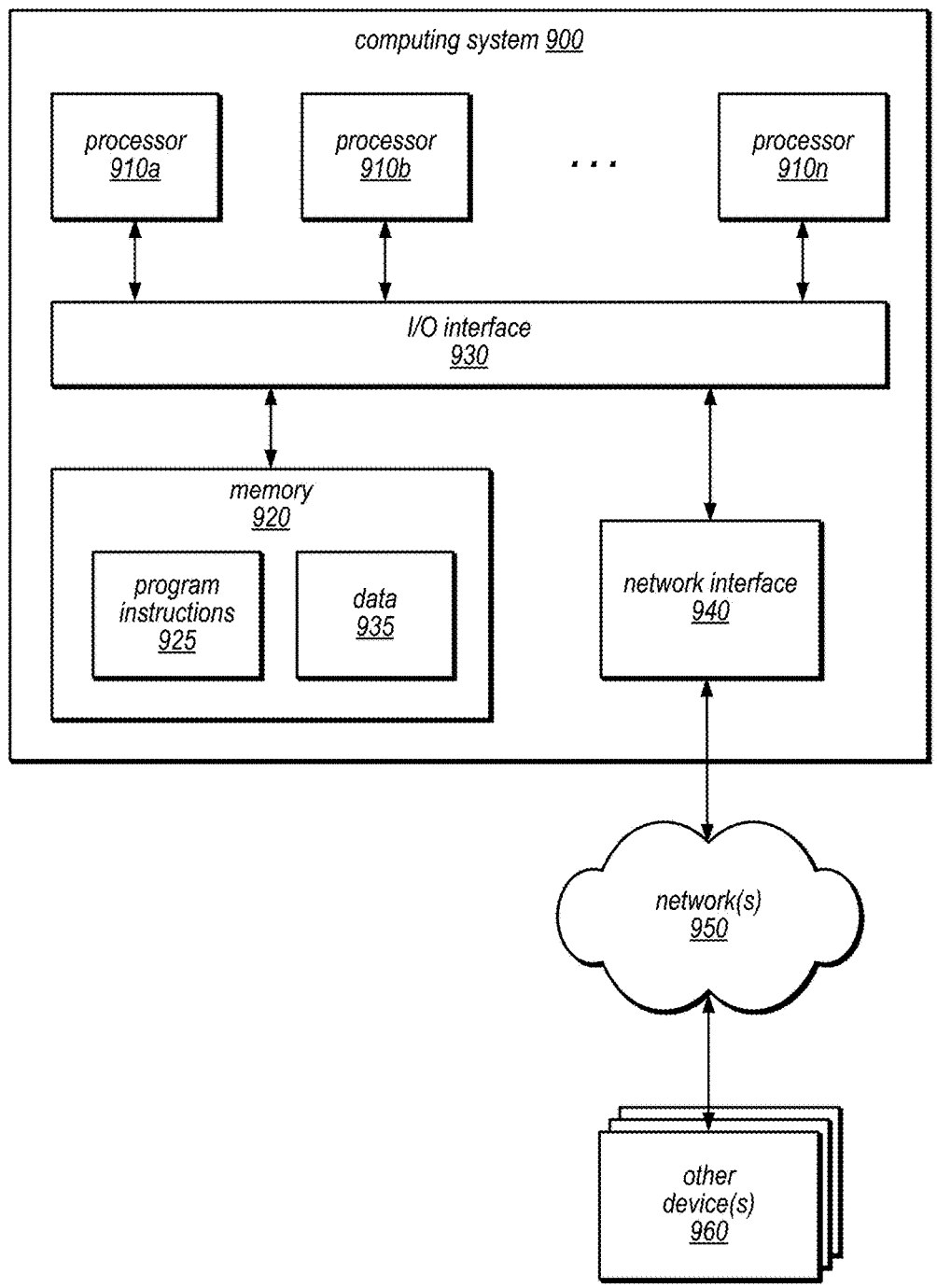
FIG. 9 is a block diagram illustrating an example computer system that can be used to implement one or more portions of a distributed computing system that implements a text annotation system that annotates text using encoder and decoder recurrent neural networks, according to some embodiments.

FIG. 9 is a block diagram illustrating an example computer system that can be used to implement one or more portions of a text annotation system that annotates text using encoder and decoder recurrent neural networks, according to some embodiments. Computer system 900 may include or be configured to access one or more nonvolatile computer-accessible media. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 920 as code 925 and data 935.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices, such as routers and other computing devices, as illustrated in FIGS. 1 through 8, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 8 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A computer-implemented method comprising:
receiving an unstructured text sequence comprising a plurality of words;
encoding the plurality of words into a plurality of encoder hidden states of an encoder recurrent neural network (RNN), wherein the encoder RNN is configured to generate a given encoder hidden state based at least in part on a word and a previous encoder hidden state;
decoding one or more of the plurality of encoder hidden states into a plurality of decoder hidden states of a decoder RNN, wherein the decoder RNN is configured to generate a given decoder hidden state based at least in part on a previous decoder hidden state and an output of the previous decoder hidden state; and
generating a sequence of annotations for individual text fragments in the unstructured text from to the decoder hidden states, wherein the annotations are selected from a set of annotations used to train the encoder RNN and decoder RNN, and generating an annotation in the sequence comprises:
determining a particular encoder hidden state associated with a particular word in the unstructured text sequence that is in a position aligned with the annotation;
determining a fixed-size attention window of a subset of the plurality of encoder hidden states surrounding the position of the particular encoder state; and
generating the annotation based at least in part on the subset of encoder hidden states in the attention window.

2. The computer-implemented method of claim 1, generating the annotation comprises:
generating a context vector that concatenates the encoder hidden states in the attention window.

3. The computer-implemented method of claim 2, wherein generating the annotation comprises:
generating the context vector using a weight vector applied to individual ones of the encoder hidden states in the attention window; and
generating the annotation based at least in part on the output of the particular decoder hidden state and the context vector.

4. The computer-implemented method of claim 1, wherein encoding a particular word in an encoder hidden state comprises:
generating an encoding of the word that indicates a character type for each character in the word, the character type comprising one or more of: a digit, an uppercase letter, a lowercase letter, or a symbol.

5. The computer-implemented method of claim 1, wherein decoding the encoder hidden states into decoder hidden states comprises:
generating a beam search tree for a particular decoder hidden state, wherein each path of the beam search tree represents a potential sequence of subsequent annotations, and an annotation generated from the particular decoder hidden state is generated based at least in part on respective probabilities of the potential sequences.

6. The computer-implemented method of claim 5, further comprising:
pruning one or more paths from the beam search tree based at least in part on their respective probabilities.

7. The computer-implemented method of claim 1, wherein:
the unstructured text sequence comprising a description of an item;

the annotations indicate features of the item reflected by different text fragments in the description; and further comprising determining metadata for the item based at least in part on the annotations.

8. The computer-implemented method of claim 7, wherein determining metadata for the item comprises one or more of: determining a title for the item, determining a category of the item, or verifying the description against the item's other metadata.

9. The computer-implemented method of claim 1, further comprising:

performing a model complexity tuning process for a text annotation model including the encoder RNN and decoder RNN, the tuning process comprising, iteratively:

training the text annotation model on a set of synthetic training data wherein truth labels for the synthetic training data are assigned in a pseudorandom fashion;

determining that a model error of the text annotation model after the training is below an error level of a naïve model that randomly generates annotations based on relative proportions of the annotations; and reducing a complexity parameter of the text annotation model based at least in part on the determination that the model error is below the error level of the naïve model.

10. The computer-implemented method of claim 9, further comprising:

performing a second model complexity tuning process for the text annotation model, the second tuning process comprising, iteratively:

training the text annotation model on another set of training data;

determining that a second model error of the text annotation model after the training on the other set of training data is below a threshold; and reducing the complexity parameter of the text annotation model based at least in part on the determination that the second model error is below the threshold.

11. A system, comprising:

one or more hardware processors with associated memory, implementing a machine learning system configured to:

receive an unstructured text sequence comprising a plurality of words;

encode the plurality of words into a plurality of encoder hidden states of an encoder recurrent neural network (RNN), wherein the encoder RNN is configured to generate a given encoder hidden state based at least in part on a word and a previous encoder hidden state;

decode one or more of the plurality of encoder hidden states into a plurality of decoder hidden states of a decoder RNN, wherein to generate a given decoder hidden state based at least in part on a previous decoder hidden state and an output of the previous decoder hidden state; and generate a sequence of annotations for individual text fragments in the unstructured text from to the decoder hidden states, wherein the annotations are selected from a set of annotations used to train the encoder RNN and decoder RNN, and to generate an annotation in the sequence, the decoder RNN is configured to:

determine a particular encoder hidden state associated with a particular word in the unstructured text sequence that is in a position aligned with the annotation;

determine a fixed-size attention window of a subset of the plurality of encoder hidden states surrounding the position of the particular encoder state; and generate the annotation based at least in part on the subset of encoder hidden states in the attention window.

12. The system of claim 11, wherein to generate the annotation, the system is configured to:

generate a context vector based on the encoder hidden states in the attention window, wherein the context vector is generated using a weight vector applied to individual ones of the encoder hidden states.

13. The system of claim 11, wherein to encode a particular word in an encoder hidden state, the encoder RNN is configured to:

generate an encoding of the word that indicates a character type for each character in the word, the character type comprising one or more of: a digit, an uppercase letter, a lowercase letter, or a symbol.

14. The system of claim 11, wherein to decode the encoder hidden states into decoder hidden states, the decoder RNN is configured to:

generate a beam search tree for a particular decoder hidden state, wherein each path of the beam search tree represents a potential sequence of subsequent annotations, and an annotation generated from the particular decoder hidden state is generated based at least in part on respective probabilities of the potential sequences.

15. The system of claim 11, wherein:

the unstructured text sequence comprising a description of an item;

the annotations indicate features of the item reflected by different text fragments in the description; and further comprising a second machine learning system that generates additional metadata for the item based at least in part on the annotations.

16. A non-transitory computer-accessible storage medium storing program instructions that when executed on one or more processors of a machine learning system, cause the machine learning system to:

receive an unstructured text sequence comprising a plurality of words;

encode the plurality of words into a plurality of encoder hidden states of an encoder recurrent neural network (RNN), wherein the encoder RNN is configured to generate a given encoder hidden state based at least in part on a word and a previous encoder hidden state;

decode one or more of the plurality of encoder hidden states into a plurality of decoder hidden states of a decoder RNN, wherein the decoder RNN is configured to generate a given decoder hidden state based at least in part on a previous decoder hidden state and an output of the previous decoder hidden state; and generate a sequence of annotations for individual text fragments in the unstructured text from to the decoder hidden states, wherein the annotations are selected from a set of annotations used to train the encoder RNN and decoder RNN, and to generate an annotation in the sequence, the program instructions when executed on the one or more processors cause the machine learning system to:

determine a particular encoder hidden state associated with a particular word in the unstructured text sequence that is in a position aligned with the annotation;

determine a fixed size attention window of a subset of the plurality of encoder hidden states surrounding the position of the particular encoder state; and generate the annotation based at least in part on the subset of encoder hidden states in the attention window.

17. The non-transitory computer-accessible storage medium of claim 16, wherein:

the unstructured text sequence comprising a description of an item;

the annotations indicate features of the item reflected by different text fragments in the description; and the program instructions when executed on the one or more processors cause the machine learning system to determine metadata for the item based at least in part on the annotations.

18. The non-transitory computer-accessible storage medium of claim 17, wherein to determine metadata for the item, the program instructions when executed on the one or more processors cause the machine learning system to perform one or more of: determine a title of the item, determining a category of the item, or verifying the description against the item's other metadata.

19. The non-transitory computer-accessible storage medium of claim 16, wherein:

the machine learning system is implemented as a part of a machine learning service configured to perform machine learning tasks on behalf of clients; and to receive the unstructured text sequence, the program instructions when executed on the one or more processors cause the machine learning system to receive to unstructured text sequence via a service interface of the machine learning service.

20. The non-transitory computer-accessible storage medium of claim 16, wherein to encode a particular word in an encoder hidden state, the program instructions when executed on the one or more processors cause the machine learning system to generate an encoding of the word that indicates a character type for each character in the word, the character type comprising one or more of: a digit, an uppercase letter, a lowercase letter, or a symbol.

* * * * *